United States Patent
Corkhill

(10) Patent No.: US 10,724,722 B2
(45) Date of Patent: Jul. 28, 2020

(54) LUMINAIRE FOR INDUCTIVE LIGHTING SYSTEM

(71) Applicant: GREENGAGE LIGHTING LTD, Edinburgh (GB)

(72) Inventor: Robin Corkhill, Edinburgh (GB)

(73) Assignee: GREENGAGE LIGHTING LTD., Edinburgh (GB)

( * ) Notice: Subject to any disclaimer, the term of this patent is extended or adjusted under 35 U.S.C. 154(b) by 0 days.

(21) Appl. No.: 16/482,006

(22) PCT Filed: Jan. 30, 2018

(86) PCT No.: PCT/GB2018/050261
§ 371 (c)(1),
(2) Date: Jul. 30, 2019

(87) PCT Pub. No.: WO2018/138533
PCT Pub. Date: Aug. 2, 2018

(65) Prior Publication Data
US 2020/0003403 A1    Jan. 2, 2020

(30) Foreign Application Priority Data

Jan. 30, 2017 (GB) .................... 1701485.3

(51) Int. Cl.
*F21V 23/02* (2006.01)
*H02J 50/10* (2016.01)
(Continued)

(52) U.S. Cl.
CPC .......... *F21V 23/023* (2013.01); *F21V 17/107* (2013.01); *F21V 23/002* (2013.01);
(Continued)

(58) Field of Classification Search
CPC .. F21S 8/068; H02J 50/10; H02J 50/12; H02J 50/70
See application file for complete search history.

(56) References Cited

U.S. PATENT DOCUMENTS 7,210,957 B2 * 5/2007 Mrakovich ........... F21V 21/002
439/404
8,128,427 B2 * 3/2012 Mochizuki ............ F21S 43/195
439/419

(Continued)

FOREIGN PATENT DOCUMENTS

WO    03/040612    5/2003

OTHER PUBLICATIONS

International Search Report for PCT/GB2018/050261, dated Mar. 15, 2018, 3 pages.

(Continued)

*Primary Examiner* — Zheng Song
(74) *Attorney, Agent, or Firm* — Nixon & Vanderhye P.C.

(57) ABSTRACT

A luminaire for an inductive power transfer lighting system includes a luminaire body having a base and a hinged lid. A seal has a first sealing surface mounted in the base and a second sealing surface mounted in the lid. The first sealing surface includes a first power cable receiving channel running from one side of the base to an opposite side. The second sealing surface includes a corresponding second power cable receiving channel. When clamped together by clamping means the lid and base are sealed together and the power cable receiving channels co-operate to form a bore for holding a power cable. At least one of the sealing surfaces includes at least one groove transverse to the direction of the bore.

18 Claims, 6 Drawing Sheets

(51) Int. Cl.
    *H02J 50/70*     (2016.01)
    *F21V 17/10*     (2006.01)
    *F21V 23/00*     (2015.01)
    *F21V 31/00*     (2006.01)
    *F21V 21/35*         (2006.01)
    *F21V 21/34*         (2006.01)

(52) U.S. Cl.
    CPC ............ *F21V 31/005* (2013.01); *H02J 50/10* (2016.02); *H02J 50/70* (2016.02); *F21V 21/34* (2013.01); *F21V 21/35* (2013.01); *F21V 23/001* (2013.01)

(56) References Cited

U.S. PATENT DOCUMENTS

| | | | | |
|---|---|---|---|---|
| 8,167,465 B2* | 5/2012 | Cha | ........................ | F21V 15/01 |
| | | | | 362/362 |
| 2010/0155135 A1* | 6/2010 | Yamamoto | ............ | F21V 21/002 |
| | | | | 174/536 |
| 2012/0075863 A1* | 3/2012 | Chen | ...................... | A47G 33/06 |
| | | | | 362/249.18 |
| 2013/0076269 A1 | 3/2013 | Shilton | | |
| 2015/0262518 A1* | 9/2015 | Freeman | .................. | F21S 4/10 |
| | | | | 362/311.02 |

OTHER PUBLICATIONS

Written Opinion of the ISA for PCT/GB2018/050261, dated Mar. 15, 2018, 7 pages.

* cited by examiner

LUMINAIRE FOR INDUCTIVE LIGHTING SYSTEM

This application is the U.S. national phase of International Application No. PCT/GB2018/050261 filed 30 Jan. 2018, which designated the U.S. and claims priority to GB Patent Application No. 1701485.3 filed 30 Jan. 2017, the entire contents of each of which are hereby incorporated by reference.

FIELD OF THE INVENTION

The present invention relates to luminaires for inductive power transfer lighting systems. The luminaire and a lighting system employing it may be for agricultural use, such as in buildings that are used for horticulture or animal husbandry.

BACKGROUND TO THE INVENTION

Inductive power transfer lighting systems can find use in harsh operating conditions. In agricultural use, such as in buildings used for horticulture or animal husbandry, high levels of dirt and dust are present. There is a need to cleanse frequently and thoroughly by washing.

An inductive system can have advantages. The power cable is generally dirt and water proof. It is not required to make wiring connections between the cable and the light fittings (luminaires) employed. Power transfer is wireless.

In a typical known system luminaires are clipped onto power cables, by clamping together two parts of the luminaire about the power cabling. This ensures close proximity between a cable and the receiver wiring coil within the luminaire. This type of system can operate satisfactorily but may be subject to ingress of dirt or water, in between the parts clamped together.

Therefore there is a continuing need for improved lighting systems, especially for use in harsh environments.

SUMMARY OF THE INVENTION

According to a first aspect the present invention provides a luminaire for an inductive power transfer lighting system; the luminaire comprising:
  a luminaire body comprising a base and a hinged lid;
  a receiving coil within the base and electrically connectable to a lamp;
  a seal comprising a first sealing surface mounted in the base and around access to the receiving coil, and a second sealing surface mounted in the lid;
  wherein the first sealing surface includes a first power cable receiving channel running from one side of the base to an opposite side, and the second sealing surface includes a corresponding second power cable receiving channel running from one side of the lid to an opposite side;
  wherein the luminaire comprises clamping means;
  whereby when the lid is closed and clamped by the clamping means to the base, the lid and base are sealed together and the power cable receiving channels cooperate to form a bore for holding a power cable passing there through, in sealing engagement with the base and the lid and proximate to the receiving coil; and
  wherein at least one of the sealing surfaces includes at least one groove transverse to the direction of the bore.

A plurality of grooves may be provided on at least one of the sealing surfaces. Both sealing surfaces may be provided with a groove or a plurality of grooves.

The effect of the groove or grooves may be to divide the sealing engagement between the first and second sealing surfaces and between the sealing surfaces and a power cable, in use.

A typical inductive lighting system may include a power distribution hub to distribute alternating current (AC) electricity of a selected current and frequency, along a power cable circuit (a bus). In laying out the lighting system at a location such as in an agriculture shed, the power cable is distributed out from the distribution hub to locations where lighting is desired. It is convenient in many cases to have both the outwards run of cable, from the power distribution hub, and the return run of cable, back to the power distribution hub, bundled together. The bus may have two cable portions running together, typically twisted together, out from the power distribution hub to a distal end of the cable run. If a single length of power cable is used, the cable turns back along itself at the distal end of the cable run. Alternatively two cable lengths are employed and are electrically connected by a termination piece at the distal end of the cable run.

Conveniently, to deliver more power to the luminaire receiving coil (or coils if more than one is fitted) both the out and back cables may pass through the luminaire body. In which case the luminaire body has two bores, each formed from a first power cable receiving channel in the first sealing surface and a corresponding second power cable receiving channel in the second sealing surface. Conveniently they two bores may be parallel running from one side of the luminaire body to the other. In use the two power cable lengths passing though the luminaire body can pass close to or even in contact with the receiver coil or coils.

A magnetic material such as a ferrite block or blocks may be provided in the base to strengthen the interaction between the power cable or cables and the receiving coil. Each power cable may pass through a channel in between portions of the magnetic material. To assist the power transfer still further the lid may include a section of magnetic material, in which case the second sealing surface may be placed around access to that section of magnetic core material so that when the lid is closed the section of core material in the lid is in close proximity, even touching, core material in the base.

A groove or grooves are provided in at least one of the sealing surfaces, transverse to the direction of the bore or bores. Grooves may be provided in both sealing surfaces. Typically grooves may be at right angles to, or substantially at right angles to, the direction of the bore or bores. The grooves may have the effect of dividing sealing engagement between the sealing surfaces and between a power cable passing thorough the luminaire and the sealing surfaces. In other words, the grooves divide the at least one of the sealing surfaces into regions where sealing contacts are made between the first and second surfaces. As the groove or grooves are transverse to the bore or bores through which a power cable runs, the effect may be to have a succession of sub seals making up the seal, one after another in the direction of the bore.

The grooves may divide the sealing engagement between the first and second sealing surfaces and between the sealing surfaces and a power cable, in use. Each groove in the first sealing surface may have a corresponding groove in the second sealing surface so that when the lid is closed, pairs of corresponding grooves are aligned, one above the other. In such an arrangement one of a pair of corresponding grooves may include a rib feature that fits into the corresponding groove on the other sealing surface. The rib features can restrain relatively deformable seal material and increase sealing force acting upon cable and housing; as shown hereafter and with reference to a particular embodiment. Advantageously the rib features may be sized so as not to extend into the full depth of a groove they fit into; to leave an air gap to prevent or at least discourage capillary action by water. Where only one of the sealing surfaces has a groove or grooves the other sealing surface may have a rib feature or features that fit into the groove or grooves.

A number of grooves may be provided on at least one or on each sealing surface to provide multiple sub seals in the direction of the bore to either side of the receiving coil, for example two or more sub seals to either side of the receiving coil. Advantageously at least one groove may be provided across each channel to either side of the location of the receiving coil.

The arrangements described herein may provide advantages. Capillary action may develop on water entering at the contact between the first and second sealing surfaces and/or between a sealing surface and a power cable surface. This may aid leakage into the body of the luminaire, especially if the clamping force between the sealing surfaces is reduced or acting unevenly. For example, on account of imperfections in a power cable surface or more generally due to the presence of dirt. As the grooves are transverse to the bore the power cable held therein may be separately sealed to the sealing surfaces more than once as it traverses the base, towards and then away from the receiving coil and (typically) the associated magnetic material.

The first and second sealing surfaces may comprise, consist of or consist essentially of a resilient material such as an elastomer for example a natural or synthetic rubber or other polymer. The surfaces may have differing hardness (deformability). For example one sealing surface is softer than the other. The softer, more easily deformed sealing surface may have relatively broader first contact portions in each sub seal and the harder sealing surface may have corresponding narrower first contact portions to bite firmly into the softer material as a seal is being made. For good sealing contact the seal may be relatively compressible, e.g. a 30 to 40% compression of the overall seal thickness may be obtained on clamping by use of suitable elastomeric materials.

A harder sealing surface may be essentially non-compressible i.e. not an elastomer or other deformable material.

Materials of low surface energy i.e. hydrophobic materials are preferred to aid in waterproofing when the luminaire is sealed shut.

In a convenient form of the luminaire, the lid may be generally rectangular in plan, fitting down onto a generally rectangular upper part of the base. The seal may then be generally rectangular. In such a luminaire the bore or bores for the power cable(s), formed when the lid is closed, may run from one short side of the rectangle to the other i.e. the power cables pass though the long dimension of the generally rectangular seal.

The luminaire body has a base and a hinged lid. Sealing is effected by closing the lid and clamping i.e. applying a closing force to keep the lid and base together in sealing contact. With a conventional hinge and closure arrangement a clamping force is applied generally opposite, or at least away from, the hinge. Such an arrangement can be satisfactory, but may not provide even clamping forces to all parts of the sealing surfaces, to give a good secure seal. Applying clamping forces directed orthogonal or substantially orthogonal to the general plane of the sealing surfaces as they are clamped together is desirable. Thus the luminaire may include further features to aid in obtaining even clamping of lid to base.

The hinge may allow movement of the lid away from the base at the hinge connection when the lid is at or near the closed position. On closure the lid may be clamped more or less directly downwards, into sealing engagement with the base, when the base is below the lid. For example a hinge pin may be located in a hinge bore that is not close fitting but has a diameter greater than the pin at least in the direction away from the base when the lid is, or is nearly, closed. Alternatively a hinge pin may be a generally loose fit in a hinge bore. This loose fit of the hinge pin allows the lid to be positively clamped to the base at the hinge side as well as elsewhere around the periphery of the lid.

Clamping together where the hinge allows some movement may be by means of a clamp at the hinge side of the luminaire body and a clamp at the side of the luminaire body opposite the hinge. Additional clamps may be employed. Clamping may even be all around the periphery of the lid and base. Where a rectangular lid and top part of the base are employed, as discussed above, a long side of the rectangle may be used for the hinge and a clamp fixing supplied at both long sides. Optionally clamp fixings may be supplied at both short sides as shown hereafter and with reference to particular embodiments. Clamps may be of any type that grips and holds together the lid and base with a force to seal at the sealing surfaces. Conveniently clamps may be clips that hinge to one or other of the base and lid, and swing about the hinge to clip lid and base together.

Clips or other clamping means as described herein can provide additional benefit, beyond co-operating with the sealing surfaces to prevent ingress of dirt or moisture. Clips or clamping means can provide adequate force of engagement to ensure a consistent magnetic circuit is formed, in turn providing a consistent power transfer and illumination of the lamp.

An arrangement that allows allow movement of the lid relative to the base at the hinge side of the luminaire, to aid sealing together, may be employed with other sealing arrangements than those of the first aspect of the invention.

Thus according to a second aspect the present invention, which may be provided separately, there is provided a luminaire for an inductive power transfer lighting system; the luminaire comprising:

- a luminaire body comprising a base connected to a hinged lid with a seal there between;
- a receiving coil within the base and electrically connectable to a lamp; and
- at least one bore running through the luminaire body; for placing a power cable there between by opening the hinged lid; and wherein
- the hinge of the lid allows movement of the lid away from the base at the hinge connection, when the lid is at or near the closed position, so that on closure the lid may be clamped into sealing engagement with the base and to a power cable running through the bore by means of a clamp acting at least at the hinge side of the luminaire body.

Typically a clamp acts at the hinge side of the luminaire body and a second clamp acts at the side of the luminaire body opposite the hinge.

Typically the luminaire will have two bores so that two power cables may be employed to provide power as discussed above with respect to the first aspect of the invention.

The luminaire may have the generally rectangular lid and top part of base discussed above with respect to the first aspect of the invention and clamping may be obtained in a similar fashion.

Additional clamps may be employed. Clamping may even be all around the periphery of the lid and base. Conveniently clamps may be clips that hinge to one or other of the base and lid, and swing on the hinge to clip lid and base together.

DETAILED DESCRIPTION

Figure 1A:
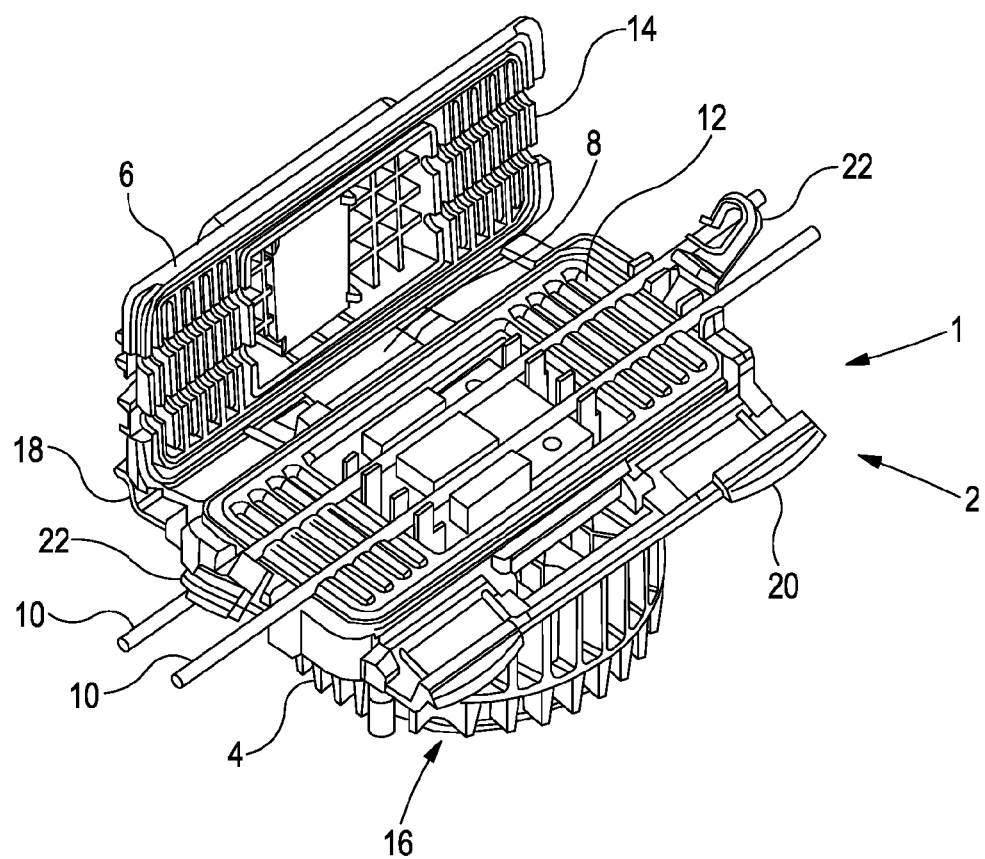
FIGS. 1a to 1d show perspective views of a luminaire fitted with power cables.

FIG. 1a shows in schematic perspective a luminaire 1 having a body 2. The body 2 has a base 4 to which is connected a lid 6 by a hinge 8 (seen better in FIG. 1c, 2b). In FIG. 1a the lid 6 is open showing the interior of the luminaire.

In this example two power cables 10 are in place running in parallel from one side of the base 4 to the other. The base 4 has a first sealing surface 12 and the lid 6 a second sealing surface 14 that together constitute a seal. The sealing arrangements are discussed in more detail below and with respect to FIGS. 3 and 4. The bottom of base 4 mounts a lamp cover 16 seen better in other FIGS. 1b, 1c and 1d). Also visible in FIG. 1a are clips 18 and 20 mounted by hinge connection to the long sides of the base 4 which is generally rectangular at its upper end. Lid 6 is also generally rectangular. Clips 22 are mounted by hinge connection to the short sides of the base 4.

Figure 1B:
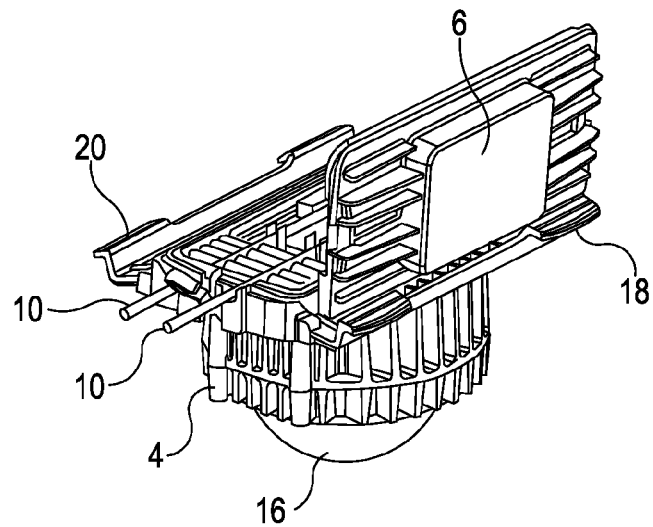

FIG. 1b shows the luminaire 1 of FIG. 1a in the same open position but viewed from a different perspective, allowing viewing of the top of lid 6 and the lamp cover 16, within which a suitable lamp may be mounted.

Figure 1C:
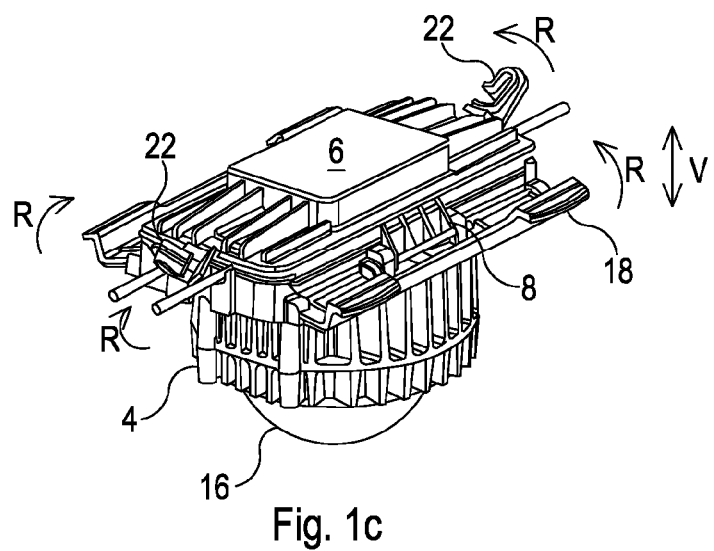
Figure 1D:
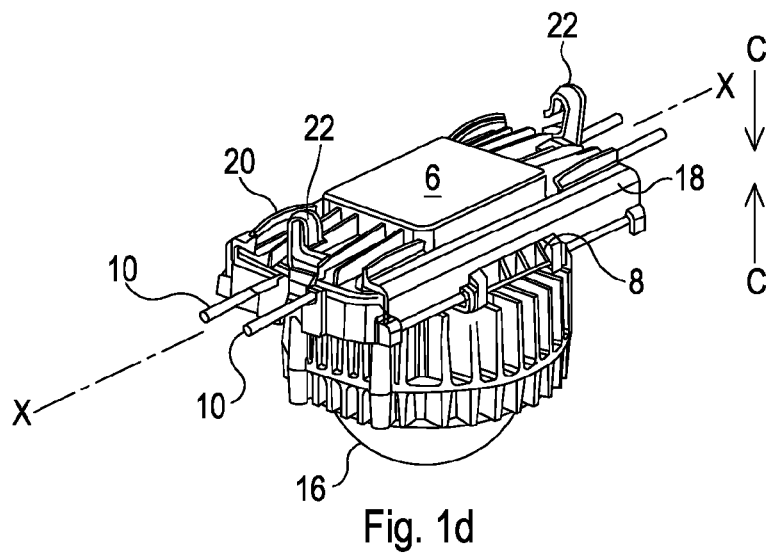
Figure 2A:
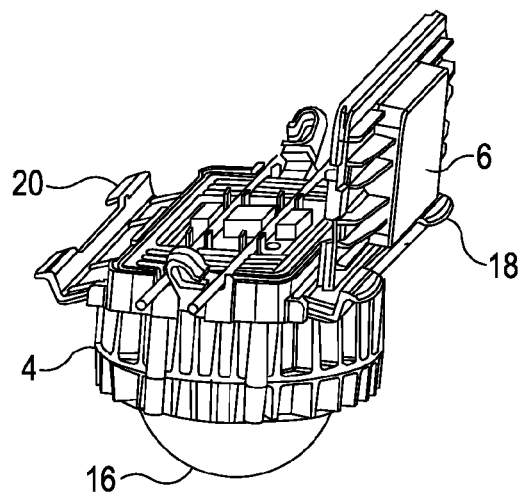
FIGS. 2a to 2c show views of the same luminaire of FIG. 1 from a different perspective.

FIGS. 1c and 1d are viewed from the same perspective as FIG. 1c and illustrate the closure procedure. FIGS. 2a and 2c do the same but from yet another perspective.

Figure 2B:
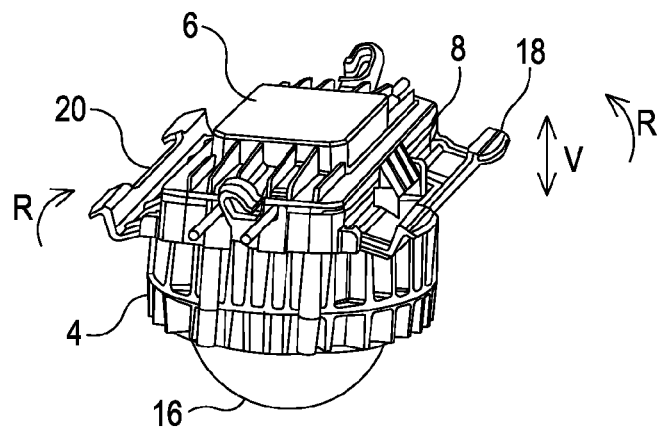
Figure 2C:
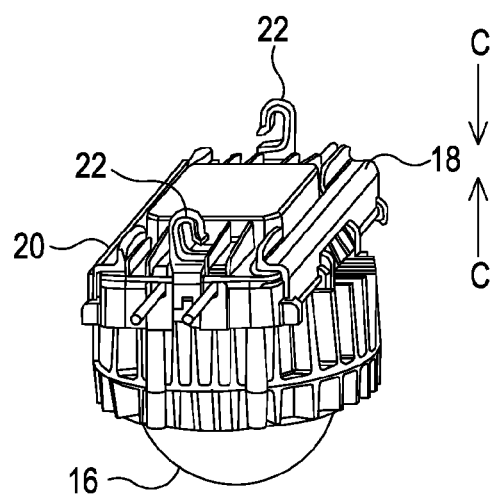

From the open position (FIGS. 1a, 1b, 2a) the lid can be swung closed to the position shown in FIGS. 1c and 2b. Here the hinge 8 allows movement of the lid 6 away from the base 4 at the hinge connection as suggested by double headed arrow V. This allows the sealing surfaces (see FIG. 3) to seat properly one on the other. Closing the clips 18, 20 and 22 as suggested by arrows R results in the clamped together condition shown in FIGS. 1d and 2c. Here upper formations on the clips 18, 20 and 22 engage upper surfaces of lid 6 to hold the lid in sealing engagement with the base 4. At the same time the cables 10 are clamped in place and sealed around. The clips provide clamping forces as suggested by opposing arrows C.

Figure 3:
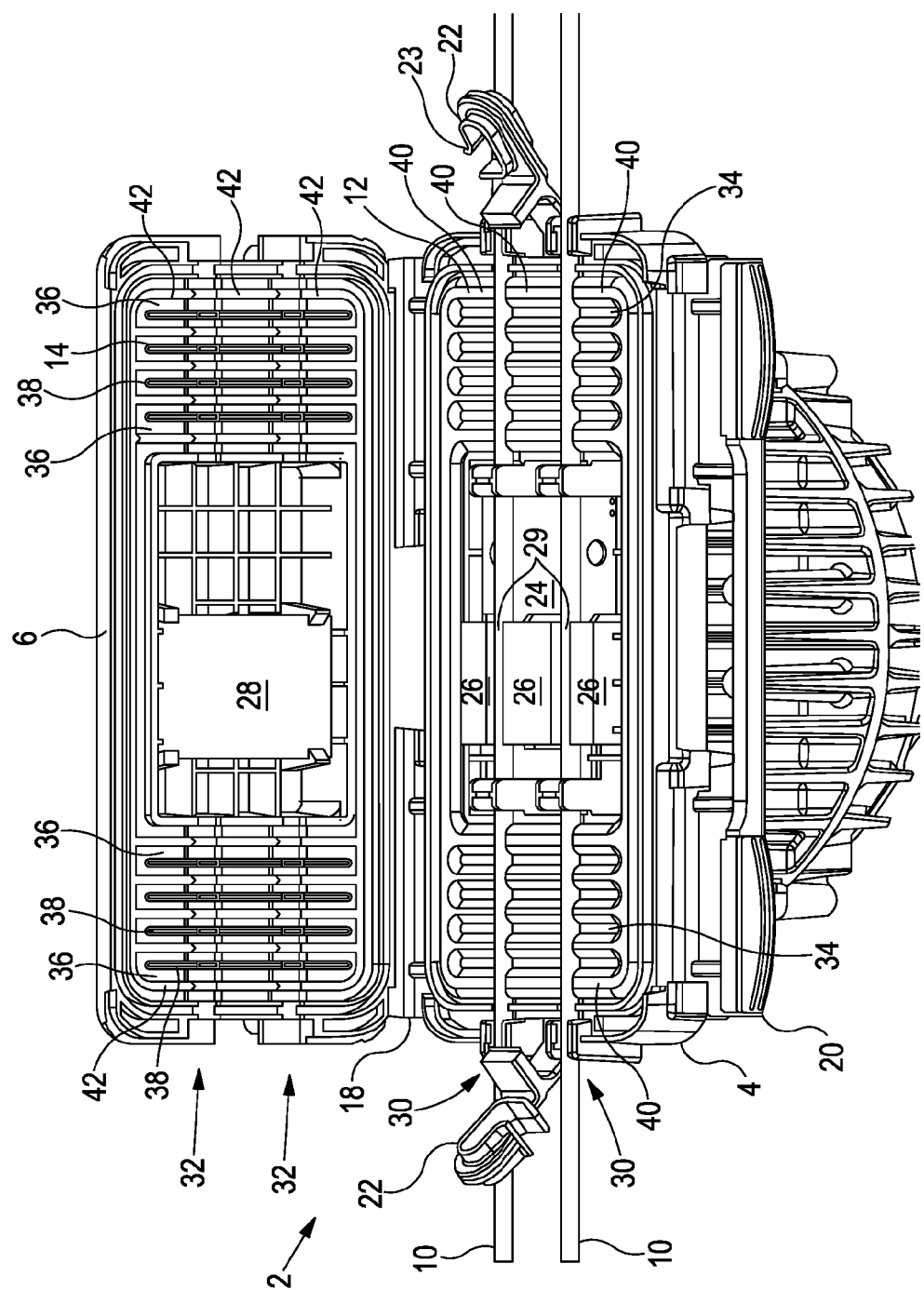
FIG. 3 shows a more detailed partial perspective view of the same luminaire with the lid open.

Clips 22 may then be used to hang the luminaire 1 from a catenary wire by means of their hook features 23 (FIG. 3).

The sealing arrangements and the interior of the luminaire may be more easily seen in enlarged view FIG. 3, which show the upper part of the luminaire with the lid open.

Visible in this view is circuit board 24 that mounts a receiving coil and blocks of ferrite 26 used to enhance energy transfer in the conventional way for an inductive system. In this example a further ferrite block 28 is provided in lid 6, which on closure of the lid interacts electromagnetically with blocks 26 in the base to enhance energy transfer.

Power cables 10 pass through channels 29 between the ferrite blocks and close to the coil on circuit board 24. Power cables 10 are received into channels 30 of the first sealing surface 12. Corresponding channels 32 of second sealing surface 14 form bores for the passage of the power cables 10 when the lid is sealed closed (FIGS. 1d and 2c).

First sealing surface 12 of an elastomer material 31, has a number of grooves 34 transverse to cables 10 dividing the surface 12. However, the uppermost, contact area of surface 12 is only interrupted around its periphery by channels 30 for the cables 10.

In this example second sealing surface 14 in lid 6 includes corresponding transverse grooves 36 to the grooves 34 of first surface 12. In this example transverse ribs 38 are provided in grooves 36 which will sit in grooves 34 when the lid 6 is closed and clamped. The rib features 38 are used to restrain the seal and increase sealing force acting upon cable and housing as discussed below and with respect to FIG. 4.

From FIG. 3 it can be seen that when lid 6 is closed and clamped shut the uppermost (first contact) surfaces 40 of first sealing surface 12 will be contacted by corresponding first contact surfaces 42 of second sealing surface 14. In this example second sealing surface 14 is of a harder material than first sealing surface 12. First contact surfaces 42 are narrower to bite into softer contact surfaces 40 when clamping is applied.

Figure 4A:
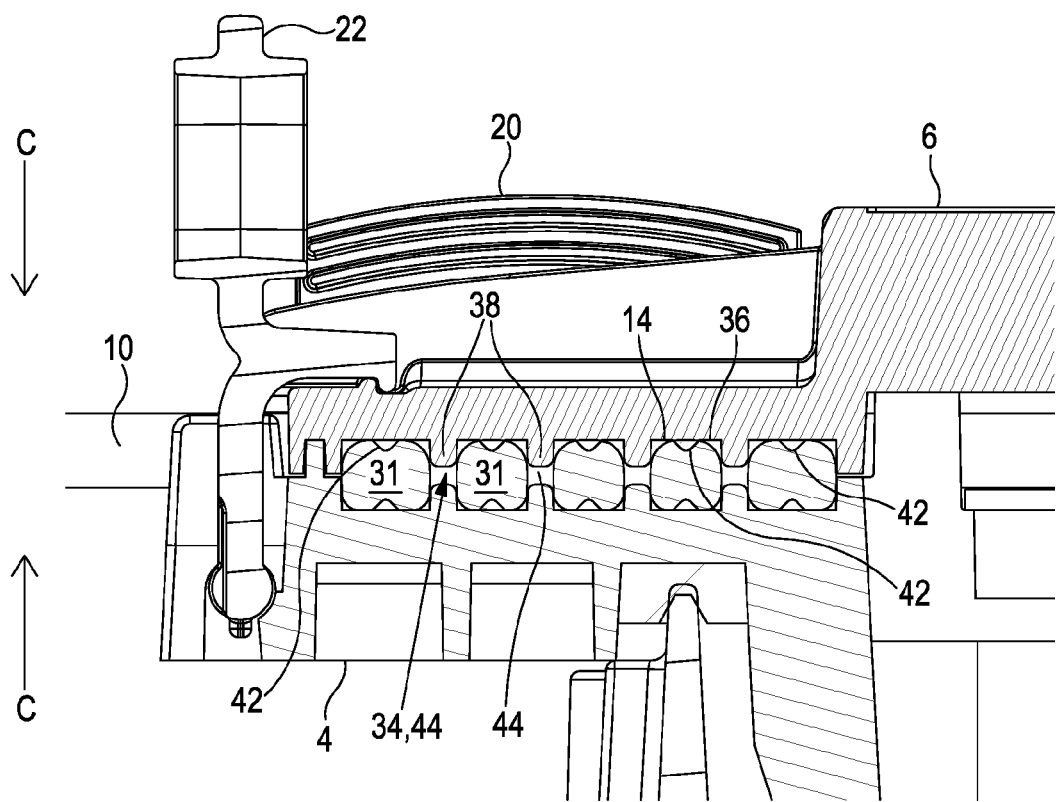
FIG. 4a shows a partial cross section view of the same luminaire to illustrate the sealing arrangement in use.

FIG. 4a shows a partial cross section view of a closed and sealed luminaire with like parts numbered the same as before. The view is taken along the centre line X-X between the cables 10 (see FIG. 1d). In this example ribs 38 extend into groove 34 of the first sealing surface 12, but not to full depth, thus leaving an air gap 44. The ribs have the effect of constraining sections (sub seal sections) of the elastomer material 31 that makes up the first sealing surface, thereby increasing the sealing forces for a given applied clamping force C. Also apparent from this view is that the first contact surfaces 42 of the second sealing surface 14 are narrow and also of significantly shorter depth than the rib features 38. Thus the grooves 36 of the second sealing surface 14 are shallow with deeper rib features 38 protruding downwards, into the much deeper grooves 34 of the first sealing surface 12.

Figure 4B:
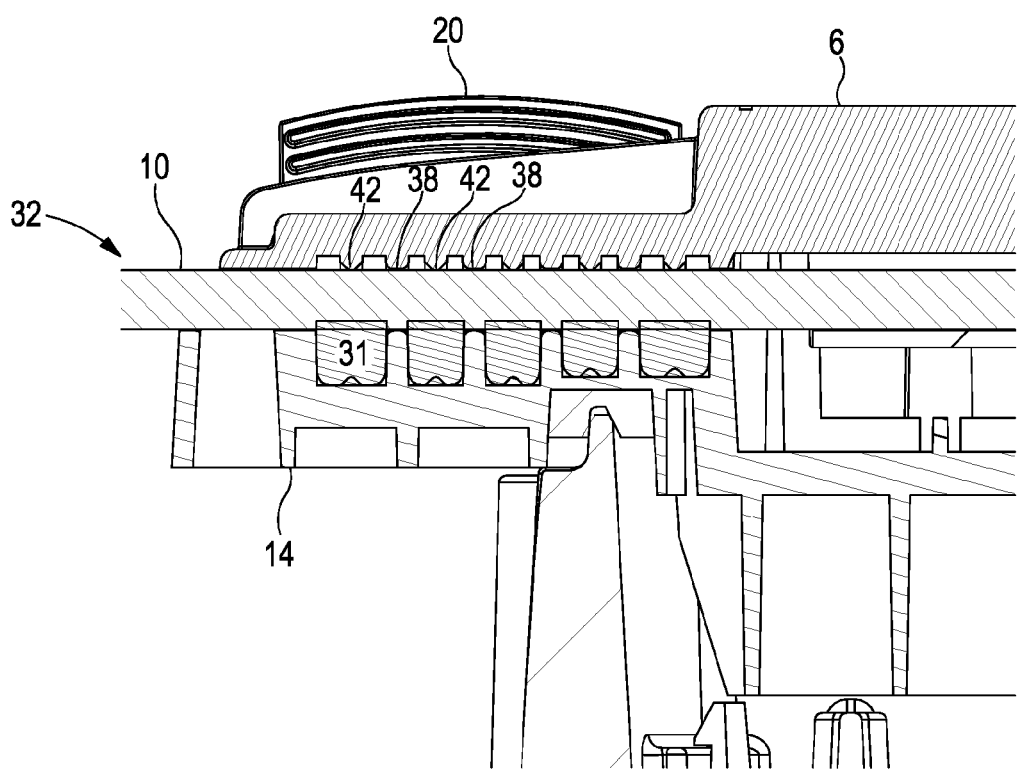
FIG. 4b shows another partial cross section view of the same luminaire to illustrate the sealing arrangement in use

FIG. 4b shows a similar cross section view to that of FIG. 4a except the cross section is along the centre of power cable 10. In this view it can be seen that in the channel 32 of second sealing surface 14 the rib features 38 are adjusted in depth to match the first contact surfaces 42 so as to provide a succession of features gripping and sealing to the power cable 10 evenly, whilst having air gaps in between.

Embodiments are described herein purely by way of non-limiting example.

The invention claimed is:

1. A luminaire for an inductive power transfer lighting system; the luminaire comprising:
    a luminaire body comprising a base and a hinged lid;
    a receiving coil within the base and electrically connectable to a lamp;
    a seal comprising a first sealing surface mounted in the base and around access to the receiving coil, and a second sealing surface mounted in the lid;

wherein the first sealing surface includes a first power cable receiving channel running from one side of the base to an opposite side, and the second sealing surface includes a corresponding second power cable receiving channel running from one side of the lid to an opposite side;

wherein the luminaire comprises clamping means;

whereby when the lid is closed and clamped by the clamping means to the base, the lid and base are sealed together and the power cable receiving channels cooperate to form a bore for holding a power cable passing there through, in sealing engagement with the base and the lid and proximate to the receiving coil; and wherein at least one of the sealing surfaces includes at least one groove transverse to the direction of the bore.

2. The luminaire of claim 1 wherein each groove in the first sealing surface has a corresponding groove in the second sealing surface so that when the lid is closed, pairs of corresponding grooves are aligned, one above the other.

3. The luminaire of claim 2 wherein at least one of a pair of corresponding grooves includes a rib feature that fits into the corresponding groove on the other sealing surface.

4. The luminaire of claim 3 wherein each pair of corresponding grooves includes a rib feature in one groove that fits into the corresponding groove on the other sealing surface.

5. The luminaire of claim 3 wherein the rib features are sized so as not to extend into the full depth of a corresponding groove they fit into, to leave an air gap.

6. The luminaire of claim 1 wherein a block or blocks of magnetic material is provided in the base to strengthen the interaction of the receiver coil with a power cable, in use.

7. The luminaire of claim 6 wherein a block or blocks of magnetic material is provided in the lid for interaction with the block or blocks of magnetic material provided in the base.

8. The luminaire of claim 7 wherein the second sealing surface is placed around access to the block or blocks of magnetic material provided in the lid so that when the lid is closed the magnetic material in the lid is in close proximity, or touching, the block or blocks of magnetic material in the base.

9. The luminaire of claim 1 wherein the hinge allows movement of the lid away from the base, at the hinge connection, when the lid is at or near the closed position.

10. The luminaire of claim 9 wherein the clamping means comprises a clamp at the hinge side of the luminaire body and a clamp at the side of the luminaire body opposite the hinge.

11. The luminaire of claim 10 wherein the lid and upper part of the base are generally rectangular and clamps are provided on all four sides of the rectangle.

12. The luminaire of claim 9 having a hinge pin located in a hinge bore that is not close fitting but has a diameter greater than the pin, at least in the direction away from the base, when the lid is, or is nearly, closed.

13. The luminaire of claim 9 having a hinge pin in a loose fit in a hinge bore.

14. The luminaire of claim 1 wherein the luminaire body has two bores, each formed from a first power cable receiving channel in the first sealing surface and a corresponding second power cable receiving channel in the second sealing surface, wherein the two bores are in parallel, running from one side of the luminaire to the other.

15. The luminaire of claim 1 wherein the groove or grooves provided are substantially at right angles to the direction of the bore or bores for holding power cables.

16. The luminaire of claim 1 wherein when the lid is closed and clamped to the base:
the groove or grooves divide sealing engagement between the sealing surfaces; and
between a power cable passing through a bore of the luminaire and the sealing surfaces in use;
so as to provide a succession of sub seals, one after the other and in the direction of the bore or bores.

17. The luminaire of claim 1 where only one of the sealing surfaces has a plurality of grooves and the other sealing surface has a plurality of rib features each fitting into a corresponding groove.

18. The luminaire of claim 1 wherein clamping means is provided by clips that hinge to one or other of the base and lid, and swing about the hinge to clip lid and base together.

* * * * *